(12) United States Patent
Robinton et al.

(10) Patent No.: US 9,685,057 B2
(45) Date of Patent: Jun. 20, 2017

(54) CHAIN OF CUSTODY WITH RELEASE PROCESS

(71) Applicant: ASSA ABLOY AB, Stockholm (SE)

(72) Inventors: Mark Robinton, Eden Prairie, MN (US); Philip Hoyer, Richmond (GB)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/772,894

(22) PCT Filed: Mar. 17, 2014

(86) PCT No.: PCT/IB2014/001558
§ 371 (c)(1),
(2) Date: Sep. 4, 2015

(87) PCT Pub. No.: WO2014/177934
PCT Pub. Date: Nov. 6, 2014

(65) Prior Publication Data
US 2016/0012696 A1 Jan. 14, 2016

Related U.S. Application Data

(60) Provisional application No. 61/794,664, filed on Mar. 15, 2013.

(51) Int. Cl.
*G08B 13/24* (2006.01)
*G06Q 10/08* (2012.01)

(52) U.S. Cl.
CPC ....... *G08B 13/2462* (2013.01); *G06Q 10/087* (2013.01); *G06Q 10/0833* (2013.01)

(58) Field of Classification Search
CPC .... G06Q 10/0833; G06Q 10/06; G06Q 10/08; G06Q 10/087; G08B 13/2462;
(Continued)

(56) References Cited

U.S. PATENT DOCUMENTS

| 7,295,114 B1 | 11/2007 | Drzaic et al. |
| 7,942,312 B2 | 5/2011 | van Ingen |

(Continued)

FOREIGN PATENT DOCUMENTS

| CN | 102663591 | 9/2012 |
| EP | 1710764 | 10/2006 |

(Continued)

OTHER PUBLICATIONS

U.S. Appl. No. 14/772,011, filed Sep. 1, 2015, Hoyer et al.
(Continued)

*Primary Examiner* — Van Trieu
(74) *Attorney, Agent, or Firm* — Sheridan Ross P.C.

(57) ABSTRACT

A tag used for storing information related to chain of custody of an object is described. The tag is at least one of attacked to a physically associated with the object and the tag includes memory that has custody claim entries written thereto. When custody of the object is transferred from one entity to another entity or when an entity relinquishes custody of the object, a release record is also written to the tag. The custody claim entries and release records written to the tag can be used to verify the chain of custody of the object.

20 Claims, 4 Drawing Sheets

(58) Field of Classification Search
CPC .... G08B 13/24; G08B 21/0261; G08B 21/0263; G08B 21/0275; H04W 12/10; H04W 4/008; H04W 8/22; H04W 8/24; H04W 8/245; H04W 12/00; H04W 12/06

See application file for complete search history.

(56) References Cited

U.S. PATENT DOCUMENTS

| | | | |
|---|---|---|---|
| 7,965,184 B1* | 6/2011 | Nichols | G06Q 10/08 |
| | | | 340/568.7 |
| 8,074,271 B2 | 12/2011 | Davis et al. | |
| 8,285,211 B2 | 10/2012 | Wang et al. | |
| 8,344,853 B1 | 1/2013 | Warner et al. | |
| 9,406,046 B2* | 8/2016 | Kawaguchi | G06Q 10/10 |
| 2004/0093493 A1* | 5/2004 | Bisbee | G06Q 20/00 |
| | | | 713/156 |
| 2006/0277061 A1 | 12/2006 | Revanur et al. | |
| 2008/0122584 A1 | 5/2008 | Itasaki et al. | |
| 2009/0240946 A1* | 9/2009 | Yeap | G06F 21/43 |
| | | | 713/176 |
| 2010/0079237 A1 | 4/2010 | Falkk et al. | |
| 2010/0299527 A1 | 11/2010 | Arunan et al. | |
| 2011/0025458 A1 | 2/2011 | Rokhsaz et al. | |
| 2011/0074552 A1 | 3/2011 | Norair et al. | |
| 2012/0159105 A1 | 6/2012 | Von Behren et al. | |
| 2012/0207305 A1 | 8/2012 | Gallo et al. | |
| 2012/0265988 A1 | 10/2012 | Ehrensvard | |
| 2013/0061303 A1 | 3/2013 | Hart et al. | |
| 2013/0344808 A1 | 12/2013 | Murray et al. | |
| 2014/0023195 A1 | 1/2014 | Lee et al. | |
| 2014/0075572 A1* | 3/2014 | Mehring | G06F 21/6218 |
| | | | 726/28 |
| 2014/0173708 A1 | 6/2014 | Garlick | |
| 2015/0208245 A1 | 7/2015 | Robinton et al. | |
| 2015/0363599 A1 | 12/2015 | Hoyer et al. | |
| 2016/0021091 A1 | 1/2016 | Hoyer et al. | |
| 2016/0021100 A1 | 1/2016 | Hoyer | |

FOREIGN PATENT DOCUMENTS

| | | |
|---|---|---|
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |

OTHER PUBLICATIONS

U.S. Appl. No. 14/897,708, filed Dec. 11, 2015, Hoyer et al.
"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].
"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from:http://www.gs1.org/sites/default/files/docs/uhfc1g2/uhfc1g2_2_0_0_standard_20131101.pdf].
"NFC Signature Record Type Definition (RTD) Technical Specification," NFC Forum, Nov. 18, 2010, 18 pages [retrieved from: http://members.nfc-forum.org/specs/spec_license].
"Oberthur Technologies partners with HID Global to carry Seos digital keys on NFC SIM cards for mobile access," ASSA ABLOY, Jul. 17, 2013, 1 page [retrieved from:http://www.assaabloy.com/en/com/press-news/news/2013/oberthur-technologies/].
Emms et al. "The Dangers of Verify PIN on Contactless Cards," Computing Science, Technical Report Series, No. CS-TR-1332, May 2012, 14 pages [retrieved from:http://www.cs.ncl.ac.uk/publications/trs/papers/1332.pdf].
Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from:http://ieeexplore.ieee.org/stamp/stamp.jsp?arnumber=05755752].
Kilas et al. "Digital Signatures on NFC Tags Master of Science Thesis," Mar. 18, 2009, 53 Pages [retrieved from: http://web.it.kth.se/~johanmon/theses/kilas.pdf].
Leicher et al. "Smart OpenID: A Smart Card Based OpenID Protocol," IFIP Advances in Information and Communication Technology, 2012, vol. 376, pp. 75-86.
Pearson "Securing the Pharmaceutical Supply Chain with RFID and Public-key infrastructure (PKI) Technologies," Texas Instruments, Jun. 2005, White Paper, 12 pages.
Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.
Saeed et al. "Off-line NFC Tag Authenticiation," The 7th International Conference for Internet Technology and Secured Transactions, 2012 International Conference for IEEE, Dec. 10, 2012, pp. 730-735.
Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.
Tan et al. "A Robust and Secure RFID-Based Pedigree System (Short Paper)," Information and Communications Security Lecture Notes in Computer Science, Jan. 2006, pp. 21-29.
Vassilev et al. "Personal Brokerage of Web Service Access," Security & Privacy, Sep. 2007, vol. 5, No. 5, pp. 24-31.
International Search Report and Written Opinion for International (PCT) Patent Application No. PCT/IB2013/002617, mailed Feb. 19, 2014 12 pages.
International Preliminary Report on Patentability for International (PCT) Patent Application No. PCT/IB2013/002617, mailed Mar. 19, 2015 8 pages.
International Search Report and Written Opinion for International (PCT) Patent Application No. PCT/IB2013/001949, mailed Feb. 25, 2014 15 pages.
International Preliminary Report on Patentability for International (PCT) Patent Application No. PCT/IB2013/001949, mailed Jan. 14, 2016 10 pages.
International Search Report and Written Opinion for International (PCT) Patent Application No. PCT/IB2014/001558, mailed Nov. 12, 2014 11 pages.
International Preliminary Report on Patentability for International (PCT) Patent Application No. PCT/IB2014/001558, mailed Sep. 24, 2015 7 pages.
International Search Report and Written Opinion for International (PCT) Patent Application No. PCT/IB2014/000853, mailed Sep. 17, 2014 15 pages.
International Preliminary Report on Patentability for International (PCT) Patent Application No. PCT/IB2014/000853, mailed Sep. 24, 2015 10 pages.
International Search Report and Written Opinion for International (PCT) Patent Application No. PCT/IB2014/000812, mailed Sep. 18, 2014 13 pages.
International Preliminary Report on Patentability for International (PCT) Patent Application No. PCT/IB2014/000812, mailed Sep. 24, 2015 8 pages.
International Search Report and Written Opinion for International (PCT) Patent Application No. PCT/IB2014/000843, mailed Sep. 12, 2014 13 pages.
International Preliminary Report on Patentability for International (PCT) Patent Application No. PCT/IB2014/000843, mailed Sep. 24, 2015 8 pages.
International Search Report and Written Opinion for International (PCT) Patent Application No. PCT/IB2014/002157, mailed Feb. 17, 2015 12 pages.
International Search Report and Written Opinion for International (PCT) Patent Application No. PCT/IB2014/002986, mailed Jun. 30, 2015 19 pages.

(56) References Cited

OTHER PUBLICATIONS

Official Action for U.S. Appl. No. 14/306,078, mailed Jul. 2, 2015 11 pages.

* cited by examiner

CHAIN OF CUSTODY WITH RELEASE PROCESS

CROSS REFERENCE TO RELATED APPLICATION

This application is a national stage application under 35 U.S.C. 371 of PCT Application No. PCT/IB2014/001558 having an international filing date of Mar. 17, 2014, which designated the United States, which PCT application claimed the benefit of U.S. Application Ser. No. 61/794,664 filed Mar. 15, 2013, which is incorporated by reference in its entirety.

CROSS-REFERENCE TO RELATED APPLICATIONS

The present application claims the benefit of U.S. Provisional Patent Application No. 61/794,664, filed on Mar. 15, 2013, the entire contents of which are hereby incorporated herein by reference in its entirety.

FIELD OF THE DISCLOSURE

The present disclosure is generally directed toward chain of custody and mechanisms for verifying the same.

BACKGROUND

When a piece of property or object changes custody from one entity to another, it is important to track that the current owner or care taker of the object has changed. It is also important to track the transfer of ownership and/or custodianship of the object and to further document that the transfer was authorized by both parties.

The above-mentioned issues related to chain of custody are specifically important with respect to highly-valuable and/or rare objects. Failure to accurately track ownership and/or custodianship of highly-valuable and/or rare objects can lead to the creation of black or gray markets, which could negatively impact the overall value of such objects.

SUMMARY

It is, therefore, one aspect of the present disclosure to provide a tag that can be used to store custody information related to an object. The tag may be attached to or otherwise physically associated with the object. To ensure the fidelity of the attachment or physical association between the tag and the object, a tamper mechanism may be provided as part of the attachment between the object and tag. The tamper mechanism may provide some indication (e.g., visual, audible, chemical, etc.) of tamper or separation of the tag from the object.

In some embodiments, the tag includes memory and a communication interface, such as a wireless communication interface. The memory can be used to store one or more custody claim entries, each of which reflect ownership or custody of the object by one or more entities. The memory can also store one or more release records, each of which reflect transfer of custody from one entity to another or an entity relinquishing custody and/or ownership of the object. The custody claim entries and/or release records can be write-protected in the memory such that they cannot be erased and/or re-written with other data. The custody claim entries and/or release records may be stored in the memory as part of a custody log.

The chain of custody of the object can be validated by analyzing the custody claim entries and/or the release records. In other words, the integrity of the chain of custody can be verified by analyzing all links in the chain and validating such links Specifically, the custody claim entries and release records should all be authentic and/or signed, as required in accordance with authentic custody claim entries and release records. Moreover, a verified link between a custody claim entry and a previous release record will provide an indication that the chain of custody is valid.

In some embodiments, a valid chain of custody stored in a custody log of a tag may include pairs of signed custody claim entries and release records. Using this method, the current owner or custodian of the object does not have to authorize the next owner or custodian—the current owner or custodian only has to release the object for reclaiming. This particular methodology requires no interaction between the successive entities that assert ownership/custodianship over the object. The custody claim entries and release records may be written to the tag in a read-only mode such that the previous records cannot be removed or edited, thereby protecting the integrity of the custody chain. Moreover, a component on the tag could make it possible only to add claims and not remove them. For instance, a specific applet or firmware on the tag could be designed to only accept add-claim commands and deny all other commands.

In some embodiments, the add claim command might be protected via an authentication mechanism such that the applet running on the tag will only add claim commands to a specific user or a group of users after having authenticated the command in some form. One possible implementation of this protection mechanism may include using a password-based derivation of a key that is written to the tag at issuance or manufacturing. This passphrase is then distributed to all members of the group of people that are allowed to add custody claims to the tag. Accordingly, any person not having the passphrase will be denied the ability to write a custody claim entry or release record to the tag. Alternatively or additionally, the protection mechanisms for the tag could include a chain counter (e.g., with a random start or a Unique Identification Number (UID) plus some counter value) that is added to each signing entry (e.g., custody claim entry or release record). Every time a new entry is written to the tag, the chain counter may be incremented and a new Trusted Authentication Cryptogram (TAC) may be generated. This particular protection mechanism will allow the reading entity to get the current counter so to include it into the signing of the new entry to be added. This way it would be almost impossible to be able to copy some or all of a custody chain and then paste the custody claim(s) to another tag. It should be appreciated that these protection mechanisms could also be extended to protect the custody log from being read (e.g., protection mechanisms can be enforced with respect to read and write commands at the applet).

In another approach, a valid chain of custody stored in the custody log of a tag may include consecutive custody claim entries written to the tag, rather than requiring pairs of custody claim entries and release records. In this particular method, the current owner/custodian would hand off a signed release record for the next owner/custodian to include their claim in the custody log. This effectively creates a claim chain. In particular, the release record could be signed by the first entity and provided directly to the second entity. The second entity may then create their own custody claim entry that include the signed release record from the first entity embedded therein. Accordingly, any custody claim entry other than the very first custody claim entry in the custody log would effectively require a signed release record by the previous owner/custodian for the chain of custody to be considered valid.

In some embodiments, the custody claim entries and/or release records may be signed using any type of known electronic signature technologies. For instance, private-public keys from a Public Key Infrastructure (PKI) or symmetric private keys can be used to sign the custody claim entries and/or release records. Without a valid signature, the custody claim entry and/or release record may be considered invalid, thereby invalidating the entire chain of custody.

In some embodiments, a tag that is at least one of attached to and physically associated with an object is provided that includes:
memory storing one or more custody claim entries therein, the one or more custody claim entries having been written to the memory by or on behalf of a first entity and asserting at least one of custody and ownership of the object by the first entity; and
a communication interface in communication with the memory that enables the one or more custody entries to be read from the memory by a reading device.

The tag may further include an Integrated Circuit (IC) chip that contains the memory and one or more electrical contacts that provide an electrical connection between the IC chip and the communication interface.

In some embodiments, the communication interface includes an antenna that is in electrical communication with the Integrated Circuit via the one or more electrical contacts. In a tag configured for wireless communications, any number of wireless communication frequencies (e.g., 125 kHz, 13.56 MHz, Ultra High Frequencies (UHF), microwave, etc.) may be used by the communication interface. Other non-contact technologies such as light-based protocols may also be used by the communication interface. Of course, contact-based tags may also be used.

In some embodiments, the one or more custody claim entries may include a first custody claim entry asserting at least one of custody and ownership of the object by the first entity and a second custody claim entry asserting at least one of custody and ownership of the object by a second entity that is different from the first entity. The second custody claim entry, may include a release token embedded therein that is signed by or on behalf of the first entity (e.g., where consecutive custody claim entries are used to maintain a proper chain of custody). Alternatively, a release record may be written between the first custody claim entry and second custody claim entry and this release record may be signed by or on behalf of the first entity, thereby signifying the first entity having relinquished ownership/custodianship of the object. In other words, the chain of custody may be verified only in response to detecting the appropriate pairs of custody claim entries and release records in the custody log.

In some embodiments, the protocols used by the tag may include an NFC protocol, Ultra-High Frequency (UHF) protocols, High Frequency (HF) protocols, a variation of Bluetooth (e.g., Bluetooth, Bluetooth 4, Bluetooth Low Energy (LE) or BLE, or any standard yet to be developed).

In some embodiments, a method of managing custody information on a tag that is at least one of attached to and physically associated with an object is provided that generally includes:
receiving, at a tag, a first instruction from a writing device, the first instruction including a first custody claim entry asserting at least one of custody and ownership of the object by a first entity;
writing the first custody claim entry into memory of the tag; and
making the first custody claim entry available for reading from the memory by a reading device.

The method may further include protecting the first custody claim entry from being erased from the memory or from being overwritten.

The method may also include receiving a request to read the first custody claim entry from the memory, the request being received from a reading device, preparing a response to the request, and transmitting the response to the reading device, wherein the response includes the first custody claim entry.

In some embodiments, the first custody claim entry may include a release token embedded therein that is signed by or on behalf of the first entity.

In some embodiments, the method may further include receiving, at the tag, a second instruction from a writing device, the second instruction including a release record signed by or on behalf of the first entity, writing the release record into the memory of the tag, receiving, at the tag, a third instruction from a writing device, the third instruction including a second custody claim entry asserting at least one of custody and ownership of the object by a second entity that is different from the first entity, and writing the second custody claim entry into the memory such that the memory stores the first custody claim entry, the release record, and the second custody claim entry.

In still other embodiments, a method of verifying a chain of custody for an object having a tag that is at least one of attached to and physically associated with the object is provided that generally comprises:
reading a first custody claim entry from a memory of the tag;
determining that the first custody claim entry is signed by a first entity and that any entity claiming ownership or custody of the object prior to the first entity has signed a release record that is also stored in the memory; and
in response to the determining step, verifying the chain of custody for the object.

The present disclosure will be further understood from the drawings and the following detailed description. Although this description sets forth specific details, it is understood that certain embodiments of the invention may be practiced without these specific details.

DETAILED DESCRIPTION

Embodiments of the present disclosure will be described in connection with a smart tag, a system for interacting with a smart tag, and verifying a chain of custody by utilizing a tag to store custody information related to an object. While most of the discussions herein refer to a "tag" as being the vehicle that stores a custody log and provides the responses to a reading device or carries information written thereto by a writing device, it should be appreciated that embodiments of the present disclosure are not so limited. Indeed, any type of device having a processor and memory capable of performing the functions of the tag discussed herein can be utilized without departing from the scope of the present disclosure. For instance, any tag form factor may be used. Examples of such form factors include card-type tags, key fobs, wristbands, smart tags embedded in clothing or other objects, smart watches, stickers, smart phones, laptops, tablets, etc.

Figure 1:
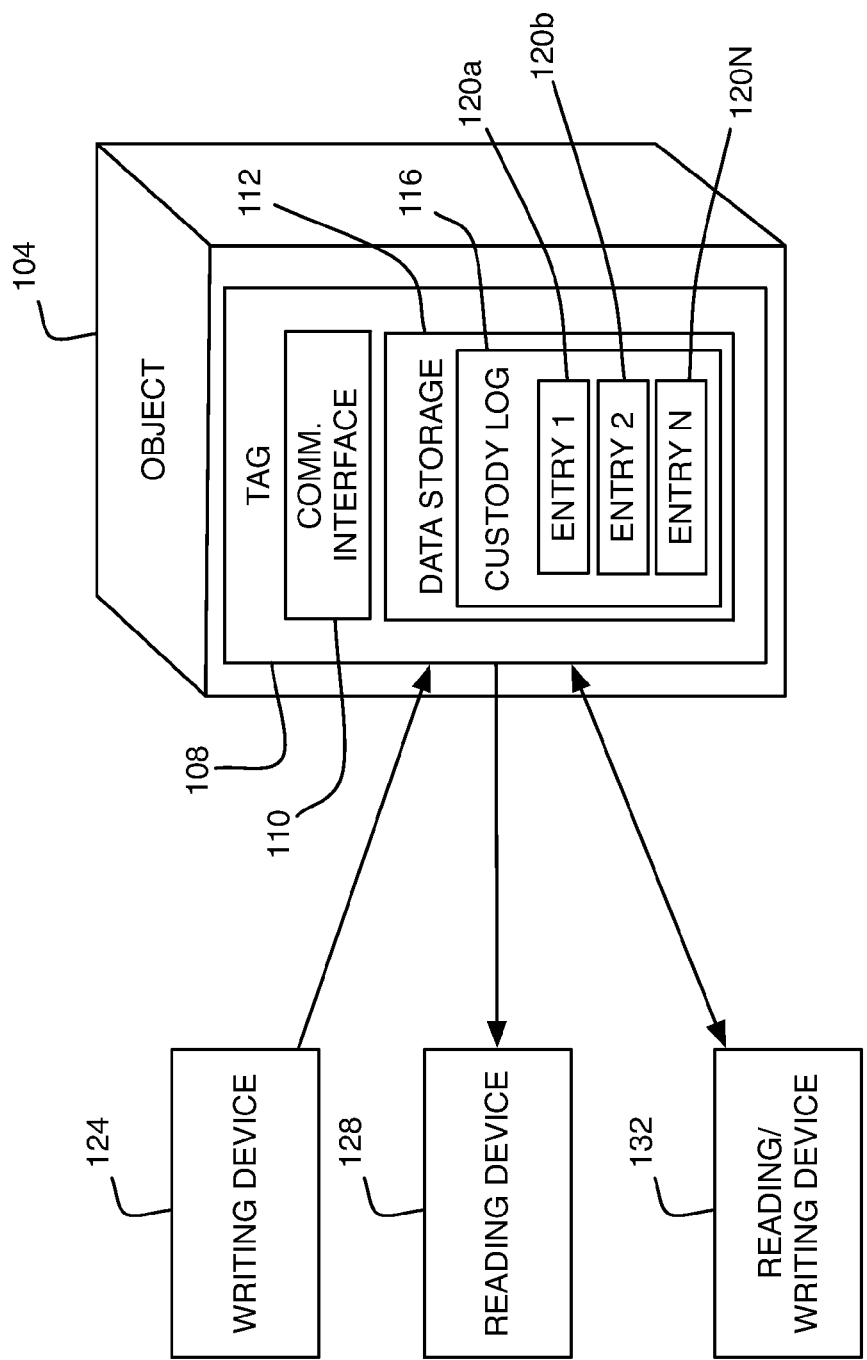
FIG. 1 is a block diagram depicting a system for managing custody information related to an object in accordance with embodiments of the present disclosure.

Referring initially to FIG. 1, a system for managing custody information related to an object 104 will be described in accordance with embodiments of the present disclosure. The object 104 may correspond to any type of movable, immovable, living, or inanimate object. The object 104, in some embodiments, may correspond to an object of particular rarity and/or high value. Non-limiting examples of an object 104 may include works of art, vehicles, legal documents, commercial paper, stocks, bonds, notes, furniture, commodities, objects being moved in transit, and so on.

The object 104 is shown to include a tag 108 attached thereto or otherwise physically associated therewith. The tag 108 may be permanently or non-removable attached to the object 104 in some embodiments. The connection between the tag 108 and object 104 may further include a tamper mechanism that maintains the integrity of the physical association between the object 104 and tag 108. Examples of tamper mechanisms include breakable seals, potting materials, chemical agents that mix and indicate tamper if the object 104 and tag 108 are separated, mechanical mechanisms that indicate tamper if the object 104 and tag 108 are separated, etc. Any type of known or yet-to-be-developed tamper mechanism may be used to protect the fidelity of the association between the tag 108 and object 104.

In some embodiments, the tag 108 may correspond to a wireless tag as is well known and used in the physical access control and/or supply chain management arts. The tag 108 may include a communications interface 110 and a data storage or memory 112. The data storage or memory 112 may be provided as part of an Integrated Circuit (IC) chip as is well known in the tag arts. Thus, the data storage 112 may also be connected to a processor (e.g., a microprocessor of the IC chip) and an applet may be used to store and manage the data written to the data storage or memory 112. Additionally or alternatively, firmware may be used to facilitate the management of data written to the data storage or memory 112. In some embodiments, the data storage or memory 112 may correspond to volatile or non-volatile memory. Even more specifically, the data storage or memory 112 may correspond to a secure memory location of an Integrated Circuit (IC). In such an embodiment, the tag 108 may correspond to an Integrated Circuit Card (ICC).

The communication interface 110 may include any type of known device or collection of devices that enables the tag 108 to communicate with other devices, such as a writing device 124, a reading device 128, or a reading/writing device 132. More specifically, the communication interface 110 may be used to facilitate the creation of a communication channel between the tag 108 and other devices 124, 128, 132. In some embodiments, the communication channel established between a device 124, 128, 132 and tag 108 may correspond to a RF inductive coupling between antennas of each device. The inductive coupling between a writing device 124 and tag 108, for example, may depend upon a relative proximity of the two devices. Thus, the communication channel may correspond to a wireless communication channel such as a Near Field Communications (NFC) channel. Other wireless and RF-based proximity protocols such as Bluetooth, WiFi (e.g., IEEE 802.11N), and the like may also be used to establish a communication channel between tag 108 and other devices. The channel may be established directly between the two devices or it may be established indirectly (e.g., by passing through a wireless router, server, and/or the like). In other embodiments, the communication channel may be wired (e.g., via a Universal Serial Bus (USB) wire, Ethernet wire, etc.) in which case the communication interface 110 may comprise a wired communication port, drivers for the same, etc.

As can be appreciated, the writing device 124, reading device 128, and/or reading/writing device 132 may correspond to any individual device or collection of devices that are capable of interacting with the tag 108 via the communication interface 110. The writing device 124 and reading/writing device 132 may be configured to write one or more entries 120a-N to the custody log 116 maintained in the data storage or memory 112. The reading device 128 and reading/writing device 132 may be configured to read one or more entries 120a-N from the custody log 116. In some embodiments, the writing device 124, reading device 128, and reading/writing device 132 may be the same or similar types of devices, but operate different modes. Alternatively, the writing device 124 may be a different type of device as compared to the writing device 128, for instance, and the reading/writing device 132 may be different from both the writing device 124 and reading device 128. As non-limiting examples, the devices 124, 128, 132 may correspond to one or more of a hand-held reader, a mobile communication device (e.g., smart phone, tablet, laptop, Personal Digital Assistant (PDA), smart watch, remote control, smart vehicle or car, etc.), Personal Computer (PC), laptop, tablet, ICC, or the like. Any type of protocol such as NFC, ISO/IEC 14443-A, ISO/IEC 14443-B, ISO/IEC 15693, JIS X6319-4, Bluetooth, WiFi, combinations thereof, extensions thereof, or modifications thereto may also be used to facilitate communications between any of the devices 124, 128, 132 and tag 108.

In some embodiments, the tag 108 may comprise an applet or firmware the protects the entries 120a-N written to the custody log 116. As an example, the entries 120a-N written to the custody log 116 may be write protected. Alternatively or additionally, the entries 120a-N could be written to the tag 108 in a read only mode such that the previously-written entries cannot be removed or edited, thereby protecting the integrity of the custody chain. Alternatively or additionally, the applet or firmware of the tag 108 may operate in such a manner so as to only enable writing of entries 120a-N. For instance, the applet or firmware may be configured to only accept add-entry commands and any other command may be rejected or ignored.

More specifically, the applet or firmware may be configured to implement one or more protection mechanisms on read and/or write commands received at the tag 108. It can be appreciated that the number and nature of such protection mechanisms may vary depending upon the sensitivity of the information contained in the custody log 116.

One non-limiting example of a protection mechanism that may be implemented by the applet or firmware includes utilizing authentication techniques at the applet or firmware prior to executing any command received at the tag 108. For instance, a passphrase may be used by the applet or firmware to authenticate users or devices prior to executing a command received from a user or device. The passphrase, as an example, may correspond to a password-based derivation of a key that is written to the tag 108 at issuance or manufacturing of the tag 108. This passphrase would then be distributed to users or groups that are allowed to write entries to and/or read entries from the custody log 116. If a command is received without the appropriate passphrase or protected by the passphrase derived key, then the tag 108 will not execute the received command.

Another non-limiting example of a protection mechanism that may be implemented by the applet or firmware includes generating a UID or counter or random number and then incrementing the counter or random number every time an entry is written to the custody log 116 to generate a Trusted Authentication Cryptogram (TAC). In particular, a TAC could be generated every time a new entry (e.g., custody claim entry and/or release record) is written to the tag 108. This makes the copying and pasting of existing claim entries in the custody log 116 difficult as the applet or firmware will not allow re-writes of entries. Instead, only unique entries can be written to a custody log 116.

It should be appreciated that the custody log 116 may be configured to store a finite number of entries 120a-N, where N is any integer value greater than or equal to zero. The size of memory used for the data storage 112 may provide the natural limit on the number of entries 120a-N that can be stored in the custody log 116. If the data storage 112 is no longer able to support additional entries 120a-N due to memory size constraints, then the tag 108 may return an error message to a writing device 124 or reading/writing device 132 if such a device attempts to write an entry to the custody log 116 but insufficient memory space is available. The error message may enable the entity attempting to write the new entry to secure a new tag 108 to the object 104 or expand memory capabilities of the tag 108. Expansions of the custody log 116 may require the assistance of authorized custody-management personnel to oversee or perform the custody log 116 expansion.

Each entry 120a-N may correspond to a string of machine-readable bits, bytes, characters, symbols, or the like. In particular, each entry 120a-N may also be signed at least by the entity that wrote the entry thereto and potentially by an entity that authorized a release of an immediately previously-written entry (e.g., one entity releasing ownership/custodianship directly to another entity). The signature of an entry 120a-N may include signatures that utilize a private key from symmetric key pairs or a public key from an asymmetric key pair (e.g., a PKI infrastructure). As will be discussed in further detail herein, the format of an entry 120a-N will depend upon whether pairs of signed custody claim entries and release records are used in the chain of custody verification or whether consecutive custody claim entries are used in the chain of custody verification.

Figure 2:
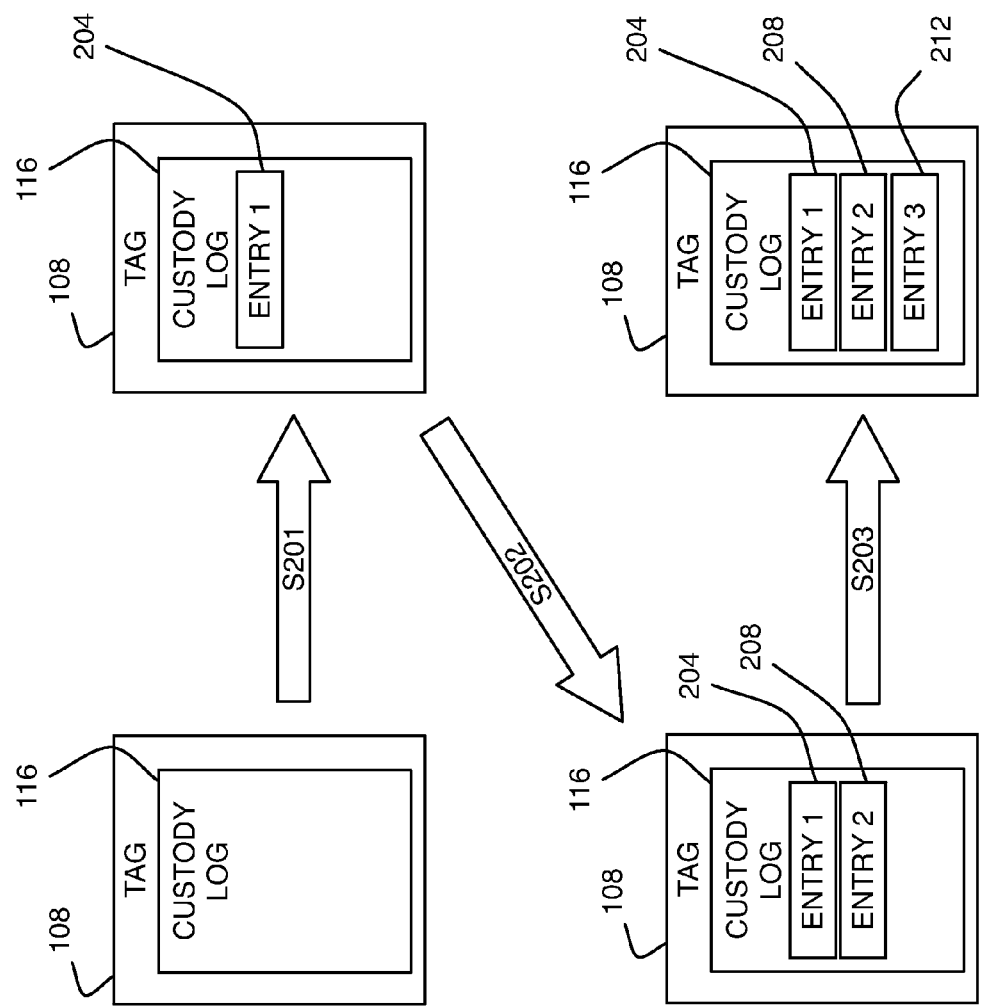
FIG. 2 is a flow diagram depicting a first method of writing entries to a custody log in accordance with embodiments of the present disclosure.

With reference now to FIG. 2, a first method of writing entries 120a-N to the custody log 116 in connection with maintaining chain of custody information for an object 104 will be described in accordance with embodiments of the present disclosure. The method begins with the tag 108 having no entries stored in its custody log 116. At some point, a first entity (e.g., a first person, group of persons, business, organization, corporation, etc.) takes ownership, possession, and/or custodianship of the object 104 with which the tag 108 is physically attached or otherwise associated. Prior to taking such ownership and/or custodianship, a first entry 204 is written to the custody log 116 either by or on behalf of the first entity (step S201). The first entry 204 may correspond to a custody claim entry signed by or on behalf of the first entity. Further still, the first entry 204 may include some number, name, or combination thereof that identifies the object 104 and the number, name, or combination thereof may be signed by or on behalf of the first entity using a private or public key. A non-limiting example of the first entry 204 includes: CLAIM (OBJECT) SIGNED BY ENTITY 1 WITH KEY, K1. As noted above, the first entry 204 may be a string of bits, bytes, characters, symbols, or the like that have been written in a computer-readable format into the custody log 116.

Once the first entry 204 has been signed by or on behalf of the first entity and written to the custody log 116, the custody log 116 now reflects that the first entity has ownership/custodianship of the object 104. The method continues when the first entity desires to relinquish ownership/custodianship of the object 104. Accordingly, a second entry 208 is written to the custody log 116 by or on behalf of the first entity to reflect the fact that the first entity has relinquished ownership/custodianship of the object 104 (step S202). In some embodiments, the second entry 208 can be written to the custody log 116 without requiring the first entity to communicate with any other entity. In other words, the first entity can release the object to be claimed by anyone else by simply writing the second entry 208 to the custody log 116. In some embodiments, the second entry 208 may correspond to a release record that is also signed by or on behalf of the first entity. The signature of the second entry 208 may use the same key or a different key from the key that was used to sign the first entry 204. To reduce the administrative burden of managing multiple key sets, it may be desirable for the first entity to utilize the same key when signing both the first entry 204 and the second entry 208. The release record signed by the first entity opens the tag 108 (and the object 104 associated therewith) to be claimed by some other entity. A non-limiting example of the second entry 208 includes: RELEASE (OBJECT) SIGNED BY ENTITY 1 WITH KEY, K1. In some embodiments, the object identifiers of the consecutive entries 204, 208 should match one another. Likewise, the entity identifies of the consecutive entries 204, 208 should match one another. As an option, the signature of the consecutive entries 204, 208 may also match one another. Failure to satisfy one or all of these conditions for the consecutive entries 204, 208 may result in invalidation of the chain of custody for the custody log 116 and, therefore, the object 104.

After the object 104 has been released by the first entity, the object 104 is free to be claimed by any other entity. Accordingly, the method will continue with a second entity (which may be different or the same as the first entity that wrote entries 204, 208 to the tag 108) claiming ownership/custodianship of the object 104 by writing a third entry 212 to the custody log 116 (step S203). Similar to the first entry 204, the third entry 212 may correspond to a custody claim entry that is signed by the second entity. The key used to sign the third entry 212 may be the same or different from the key used by the first entity to sign the first entry 204. A non-limiting example of the third entry 212 includes: CLAIM (OBJECT) SIGNED BY ENTITY 2 WITH KEY, K2.

In this particular chain of custody management scheme, a valid chain of custody requires custody claim entries and release records to occur in sequential pairs. Failure of the custody log 116 to contain such sequential pairs of custody claim entries and release records may result in the invalidation of the chain of custody. In other words, a custody log 116 with a valid chain of custody will only have entries follow the pattern: CUSTODY CLAIM ENTRY; RELEASE RECORD; CUSTODY CLAIM ENTRY; RELEASE RECORD; CUSTODY CLAIM ENTRY; . . . ; etc. In other words, the custody log 116 has a series of sequentially written entries that follow a predetermined pattern. If the custody log 116 has consecutive custody claim entries or consecutive release records, then the chain of custody may be considered invalid. Similarly, this particular chain of custody management scheme utilizes the fact that each successive entity claiming ownership/custodianship of the object 104 will write successive entries for claiming ownership/custodianship and then relinquishing the same. If the custody log 116 does not have a release record by an entity paired with an immediately previous custody claim entry by that same entity, then the chain of custody may be considered invalid. It should be appreciated, that this process may be allowed to validate the chain of custody part-by-part (e.g., via partial validations). Implementing this part-by-part validation enables the validation process to easily determine the point/moment/event at which things went awry (e.g., the chain of custody was broken or otherwise violated).

An advantage to utilizing the custody management scheme depicted in FIG. 2 is that each entity in the chain of custody does not have to communication directly or indirectly with one another during the transfer or custody. In other words, the first entity that wrote the first custody claim entry and first release record does not have to release the object 104 directly to the next entity claiming ownership/custody. A downside to this particular scheme, however, is that two entries are required for every change of ownership/custodianship of the object 104. If the object 104 is transferred a large number of times, then the number of entries 120a-N may exceed the storage limits of the data storage 112.

Figure 3:
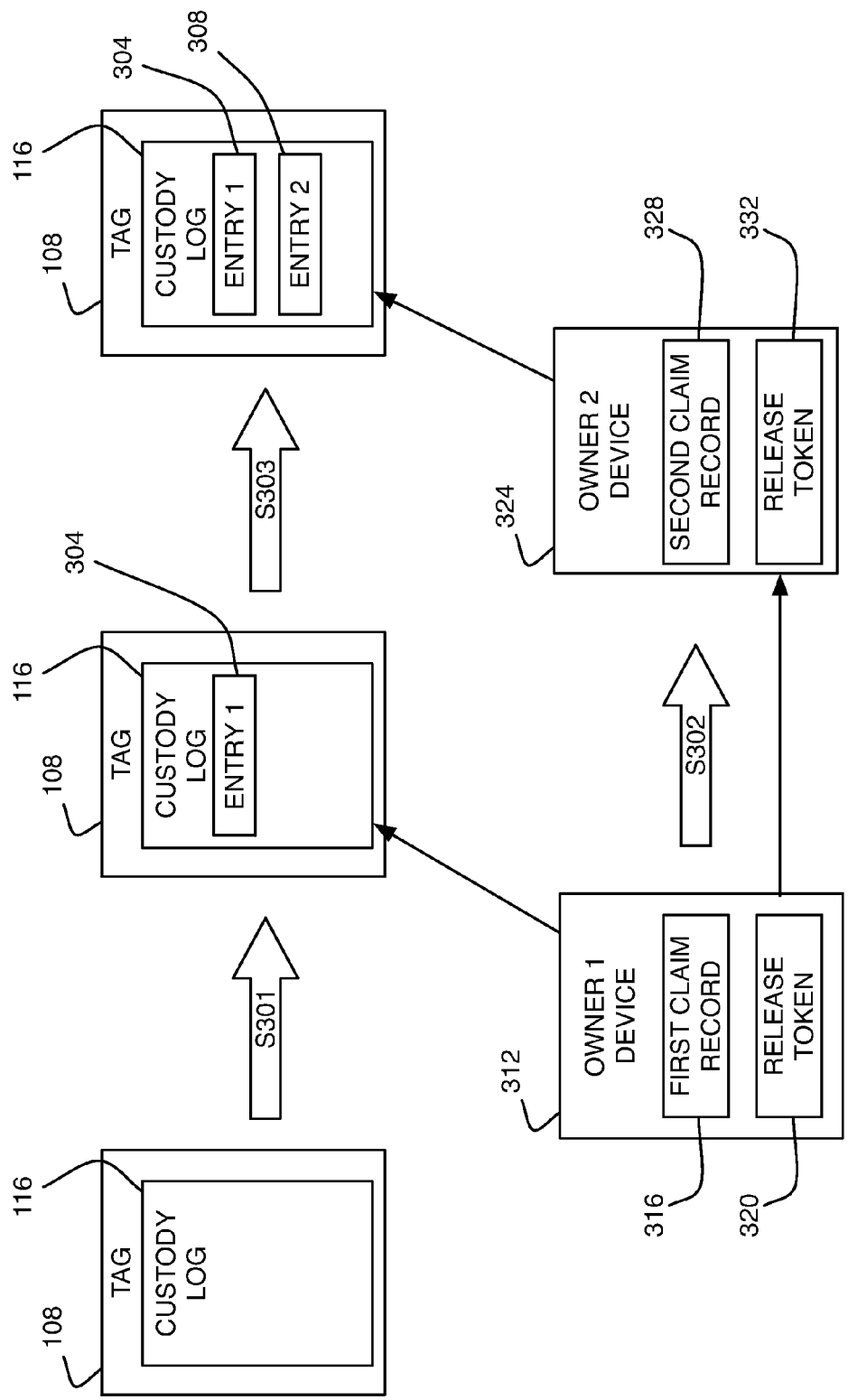
FIG. 3 is a flow diagram depicting a second method of writing entries to a custody log in accordance with embodiments of the present disclosure.

Accordingly, another custody management scheme is proposed herein whereby consecutive custody claim records can be written to the tag 108. In particular and with reference to FIG. 3, a second method of writing entries 120a-N to the custody log 116 in connection with maintaining chain of custody information for an object 104 will be described in accordance with embodiments of the present disclosure. The method begins with the tag 108 having no entries stored in its custody log 116. The method continues when a first entity asserts ownership/custodianship over the object 104 and write the first entry 304 to the custody log 116 (step S301). The first entry 304 may be similar or identical to the first entry 204 in that the first entry 304 may comprise a custody claim entry that is signed by the first entity. In some embodiments, the first entry 304 may correspond to an object identifier that is signed by or on behalf of the first entity. Moreover, the first entry 304 may correspond to a first claim record 316 written to the tag 108 by a device operated by the first entity 312. The device 312 may correspond to any one of a writing device 124, reading device 128, and reading/writing device 132. A non-limiting example of the first entry 304 includes: CLAIM (OBJECT) SIGNED BY ENTITY 1 WITH KEY, K1.

When the first entity desires to relinquish ownership/custodianship of the object 104 to another entity (e.g., a second entity), the first entity may generate a release token 320 with device 312 and the release token 320 may be passed to a device operated by the second entity 324 (step S302). The release token 320 may be incorporated into a second claim record 328 generated at device 312. This second claim record 328 may then be written to the custody log 116 as a second entry 308 (step S303). Once the second entity write the second entry 308 to the custody log 116, ownership/custodianship of the object 104 is effectively transferred from the first entity to the second entity. A non-limiting example of the second entry 308 includes: CLAIM (RELEASE (OBJECT) SIGNED BY ENTITY 1 WITH KEY, K1) SIGNED BY ENTITY 2 WITH KEY, K2. Accordingly, the custody log 116 in this scheme will only have custody claim records written thereto. All but one of the custody claim records will have a release record embedded therein that is signed by the entity that signed the immediately preceding custody claim entry to the custody log 116. Contrasted to the scheme depicted in FIG. 2, the scheme of FIG. 3 does not utilize as many entries to manage the chain of custody, possibly facilitating the use of a smaller data storage 112 or more transfers of the object 104.

Figure 4:
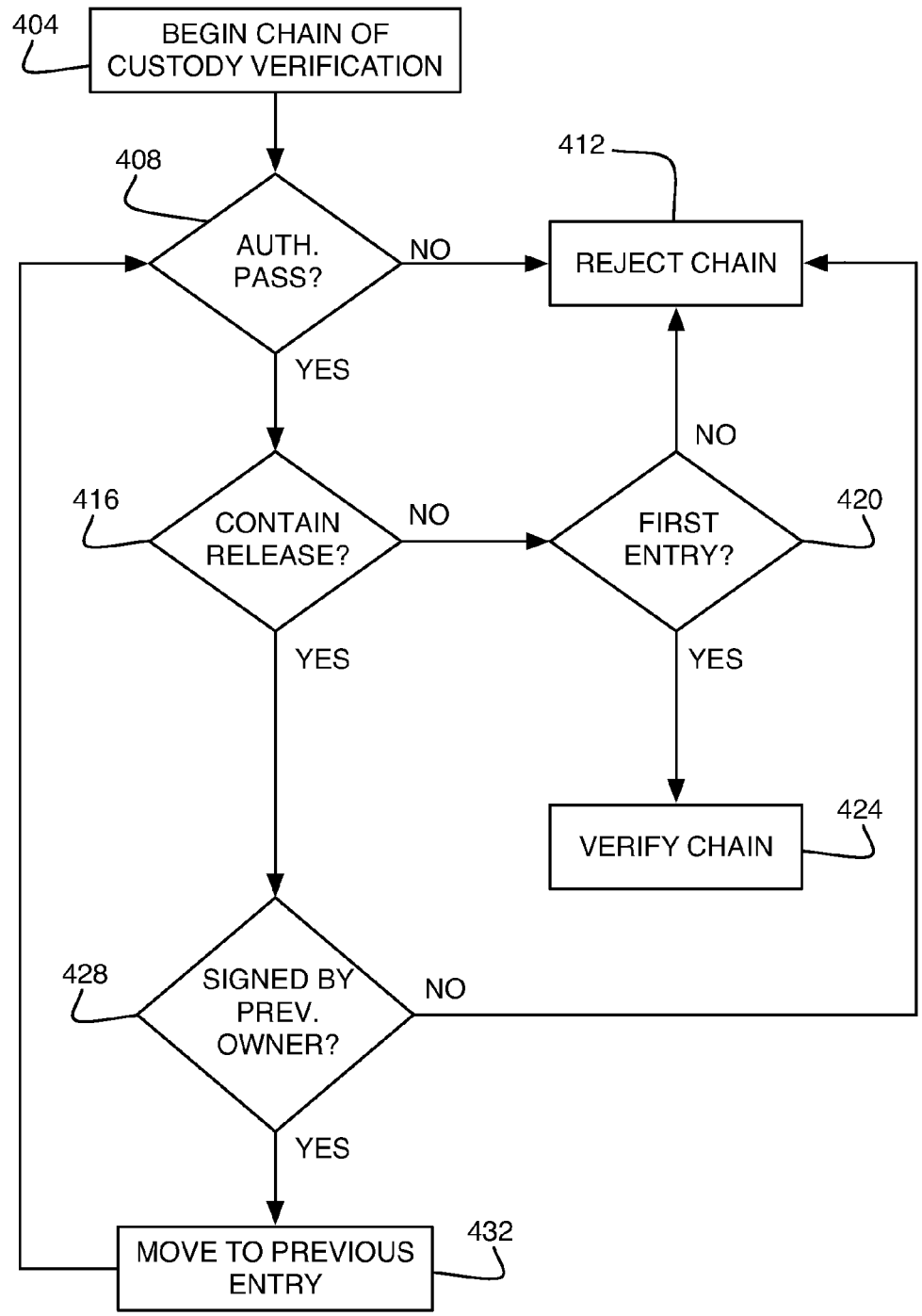
FIG. 4 is a flow diagram depicting a method of verifying chain of custody information in accordance with embodiments of the present disclosure.

With reference now to FIG. 4, a method of verifying a chain of custody for entries in a custody log 116 and, therefore an object 104, will be described in accordance with embodiments of the present disclosure. The method begins with a reading device 128 or reading/writing device 132 initiating a chain of custody verification process (step 404). To verify the integrity of the chain of custody all entries in the custody log 116 must be validated for their authenticity and then the links between successive entries must be validated. Accordingly, the first step in the process may include analyzing all entries or just the last-written entry to ensure that they contain a valid signature and are of the proper format/size (step 408). If the authenticity of the analyze entry(ies) is not validated, then the entire chain of custody is rejected (step 412).

If the analysis of step 408 is passed, then the process continues by analyzing the newest entry in the custody log 116, which may correspond to the last-written entry in the custody log 116 to determine if the entry is or contains a release record (step 416). If the last-written entry in the custody log 116 does not contain or correspond to a release record, then it is determined if the entry is also the first entry in the custody log 116 (step 420). If the analysis of step 420 is answered negatively, then the chain of custody is not validated (step 412). On the other hand, if the analysis of step 420 is answered affirmatively, then the chain of custody is validated (step 424).

Referring back to step 416, if the newest entry in the custody log 116 corresponds to or has a release record embedded therein, then the process continues by determining if that release record was appropriately signed by the previous owner/custodian of the object 104 (step 428). If the query of step 428 is answered negatively, then the chain of custody is not validated (step 412). If the query of step 428 is answered affirmatively, then the analysis moves to the previous claim in the custody log 116 (step 432). Upon moving to the previous entry, the process returns back to step 408 to repeat the analysis that was just performed on the prior entry. In other words, this verification process will continue until the chain of custody is rejected or until the very first entry in the custody log 116 is reached and verified as legitimate/authentic at which point the chain of custody is also verified.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A tag that is at least one of attached to and physically associated with an object, the tag comprising:
   memory storing a first entry and a second entry in a custody log maintained therein, wherein the first entry comprises a first custody claim entry that was written to the custody log by or on behalf of a first entity, and wherein the second entry comprises a first release token signed by the first entity that releases the object for another entity to claim; and
   a communication interface in communication with the memory that enables access to the memory by at least one of a reading device and a writing device.

2. The tag of claim 1, wherein the second entry comprises a second custody claim entry that was written to the custody log by or on behalf of a second entity and wherein the second entry comprises the first release token embedded therein.

3. The tag of claim 2, wherein the second entry is also signed by the second entity and wherein the second entity is different from the first entity.

4. The tag of claim 1, wherein the memory further stores a third entry, wherein the third entry comprises a second custody claim entry that was written to the custody log by or on behalf of a second entity, wherein the third entry was written to the custody log only after the first and second entries were written to the custody log.

5. The tag of claim 4, wherein the second entry comprising the first release token is only signed by the first entity and wherein the third entry comprising the second custody claim is only signed by the second entity.

6. The tag of claim 5, wherein the first release token is signed with a first encryption key and wherein the second custody claim is signed with a second encryption key that is different from the first encryption key.

7. The tag of claim 4, wherein the first entry comprising the first custody claim asserts at least one of custody and ownership of the object for the first entity, wherein the third entry comprising the second custody claim asserts at least one of custody and ownership of the object for the second entity, and wherein the first release token signed by the first entity releases the object for reclaiming independent of the second entity asserting at least one of custody and ownership of the object.

8. The tag of claim 1, wherein the first release token is signed by the first entity with at least one of a private key from a symmetric key pair and a public key from an asymmetric key pair and wherein the first entry and second entry are both signed by the first entity thereby signifying a claim and subsequent release of object custody by the first entity.

9. The tag of claim 1, further comprising a custody log protection mechanism that is configured to protect the custody log from at least one of having illegitimate entries written thereto and having entries illegitimately read therefrom.

10. The tag of claim 9, wherein the custody log protection mechanism implements a chain counter that is incremented at least after a new entry is written to the custody log and can be read wherein the custody log protection mechanism utilizes the chain counter to ensure that previously-written entries are not copied and pasted into the custody log and wherein the incrementing of the chain counter results in generation of a new Trusted Authentication Cryptogram (TAC) that further protects the custody log.

11. The tag of claim 1, wherein the first entry and second entry are written sequentially to the custody log without any intervening entry being written to the custody log.

12. A method of managing custody information on a tag that is at least one of attached to and physically associated with an object, the method comprising:
   receiving, at a tag, a first instruction from a writing device, the first instruction including a first custody claim entry asserting at least one of custody and ownership of the object by a first entity;
   writing the first custody claim entry into a custody log maintained in memory of the tag;
   receiving, at the tag, a second instruction from a writing device, the second instruction including a first release token signed by the first entity;
   writing the first release token into the custody log; and
   making the first custody claim entry and the first release token available for reading from the memory by a reading device.

13. The method of claim 12, further comprising:
   generating a first Trusted Authentication Cryptogram (TAC);
   storing the first TAC in association with the first custody claim entry;
   generating a second TAC that is different from the first TAC; and
   storing the second TAC in association with the first release token.

14. The method of claim 13, further comprising:
   receiving a request to read the custody log, the request being received from the reading device;
   receiving the first TAC and the second TAC from the reading device; and
   only in response to receiving the first TAC and the second TAC from the reading device, generating and transmitting the response to the reading device, wherein the response includes the first custody claim entry and the first release token.

15. The method of claim 12, wherein the first release token is embedded in a second custody claim entry written to the custody log and wherein the second custody claim entry is also signed by a second entity.

16. The method of claim 15, wherein the first release token is signed with a first key and wherein the second custody claim entry is signed with a second key that is different from the first key.

17. A method of verifying a chain of custody for an object having a tag that is at least one of attached to and physically associated with the object, the method comprising:
   reading a first custody claim entry from a custody log maintained in a memory of the tag;
   determining that the first custody claim entry is signed by a first entity and that any entity claiming ownership or custody of the object prior to the first entity has signed a release record that is also stored in the custody log; and
   in response to the determining step, verifying the chain of custody for the object.

18. The method of claim 17, wherein verifying the chain of custody for the object is further dependent upon ensuring that each custody claim entry in the custody log has a valid signature associated therewith as well as a release record associated therewith that also has a valid signature.

19. The method of claim 18, wherein verifying the chain of custody for the object is further dependent upon analyzing a counter value associated with each custody claim entry and release record in the custody log and determining that sequential entries in the custody log comprise sequential counter values.

20. The method of claim 18, further comprising:
implementing a chain counter that is incremented at least after a new entry is written to the custody log and is readable, wherein the incrementing of the chain counter results in generation of a new Trusted Authentication Cryptogram (TAC) that further protects the custody log; and
utilizing the chain counter to ensure that previously-written entries are not copied and pasted into the custody log.

* * * * *